US006755309B1

(12) United States Patent
Runge

(10) Patent No.: US 6,755,309 B1
(45) Date of Patent: Jun. 29, 2004

(54) BICYCLE STAND

(76) Inventor: Keith Runge, 770 Pearl Dr., St. Louis, MO (US) 63376

( * ) Notice: Subject to any disclaimer, the term of this patent is extended or adjusted under 35 U.S.C. 154(b) by 0 days.

(21) Appl. No.: 10/369,166

(22) Filed: Feb. 18, 2003

(51) Int. Cl.[7] ................................................. A47F 7/00
(52) U.S. Cl. ............................ 211/20; 211/183; 211/22
(58) Field of Search ............................... 211/20, 22, 23, 211/17, 24, 175, 183; 16/366, 367; D12/115; 224/42.12, 42.13; 403/53, 64, 65, 119, 169

(56) References Cited

U.S. PATENT DOCUMENTS

| 350,243 | A | * | 10/1886 | Gump | 211/22 |
|---|---|---|---|---|---|
| 418,829 | A | * | 1/1890 | Towle | 211/5 |
| 472,192 | A | * | 4/1892 | Loring | 16/365 |
| 598,298 | A | * | 2/1898 | Walton | 211/22 |
| 611,401 | A | | 9/1898 | White | |
| 631,665 | A | * | 8/1899 | Potter | 211/5 |
| 1,069,505 | A | * | 8/1913 | Wheatley | 16/367 |
| 1,100,684 | A | * | 6/1914 | Stoakes | 16/367 |
| 1,124,400 | A | * | 1/1915 | Edwards | 16/367 |
| 1,887,549 | A | * | 11/1932 | Ervin | 16/367 |
| 3,204,606 | A | * | 9/1965 | Parr et al. | 119/514 |
| 3,521,421 | A | * | 7/1970 | Schroeder, Jr. | 52/648.1 |
| 3,724,844 | A | * | 4/1973 | Olmstead et al. | 482/61 |
| 3,757,476 | A | * | 9/1973 | Schoen | 52/646 |
| 4,269,049 | A | | 5/1981 | Henderson | 70/227 |
| 5,301,817 | A | | 4/1994 | Merritt | 211/5 |
| 5,337,452 | A | * | 8/1994 | LeBlanc et al. | 16/367 |
| 5,735,410 | A | | 4/1998 | Kallstrom | 211/20 |
| 5,944,198 | A | | 8/1999 | Ihalainen | 211/5 |
| 5,988,402 | A | * | 11/1999 | Mayfield | 211/20 |
| 6,116,483 | A | * | 9/2000 | MacKarvich | 224/42.24 |
| 6,241,104 | B1 | * | 6/2001 | Kraus | 211/20 |
| 6,293,353 | B1 | * | 9/2001 | Poole | 172/776 |
| 6,601,712 | B2 | * | 8/2003 | Dean et al. | 211/20 |
| 6,640,979 | B1 | * | 11/2003 | Mayfield | 211/20 |

FOREIGN PATENT DOCUMENTS

DE 531326 * 3/1930 ................. 211/17

* cited by examiner

Primary Examiner—Jennifer E. Novosad
(74) Attorney, Agent, or Firm—Polster, Lieder, Woodruff & Lucchesi, L.C.

(57) ABSTRACT

A bicycle stand for supporting a wheel of a bicycle comprises a base having a front end and a back end, a ramp mounted on the front end of the base, a three-way hinge having three hinge portions with one of the hinge portions being attached to the ramp, a pair of opposed base supports mounted on the back end of the base, a pair of opposed side supports with each of the side supports being attached to one of the hinge portions, a pair of movable support rods with each of the rods connected to one of the base supports and one of the side supports, and a tensioning member connected to the ramp and one of the side supports.

20 Claims, 5 Drawing Sheets

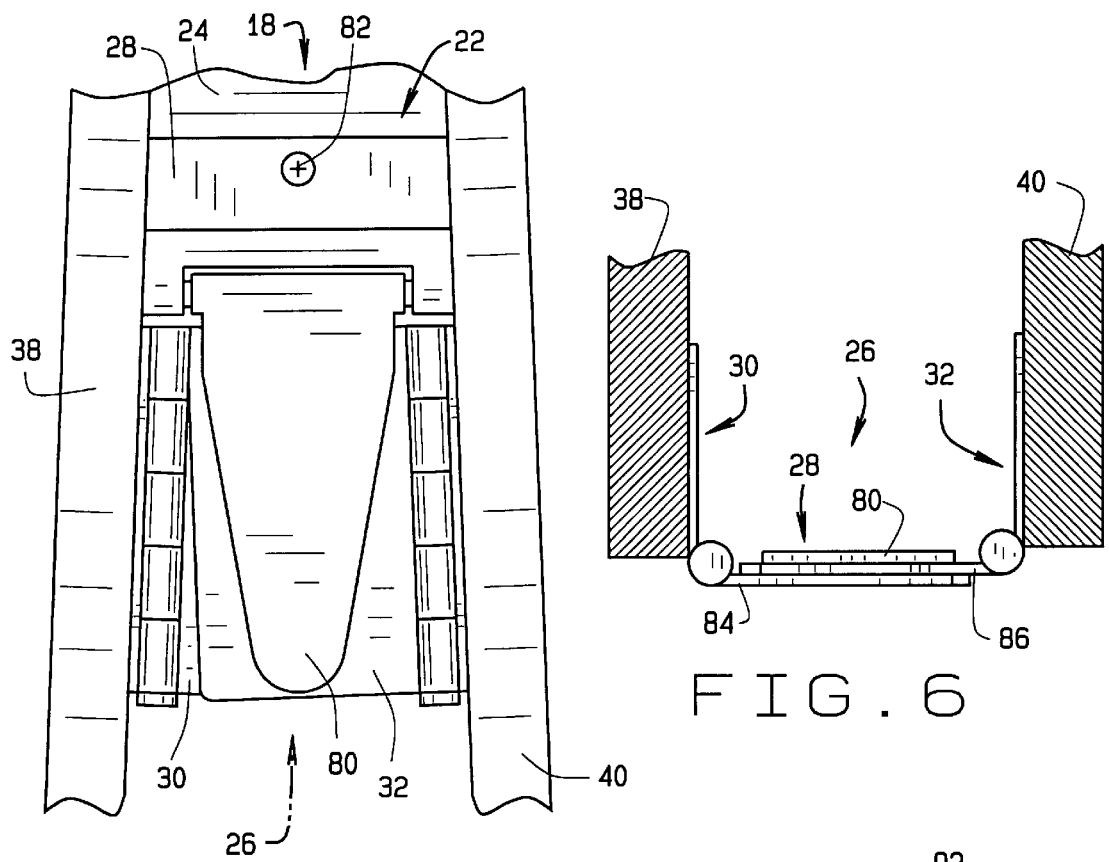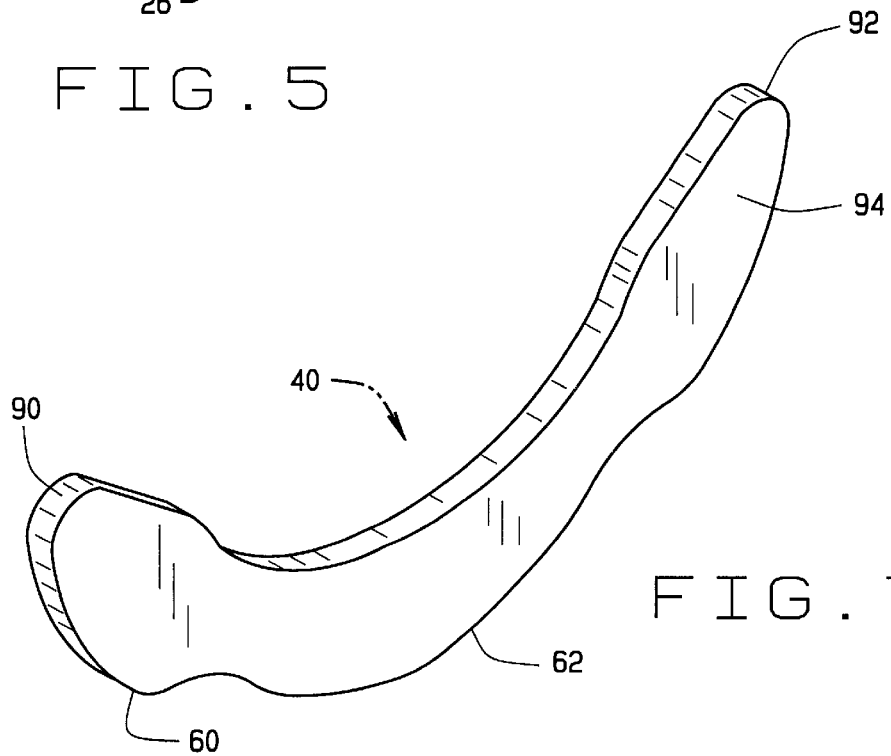

BICYCLE STAND

BACKGROUND OF THE INVENTION

This invention relates to a bicycle stand and more particularly to a bicycle stand that is capable of holding and securing a tire of a bicycle.

Bicycles having two wheels, such as mountain bikes and road bikes, are well known vehicles of transportation. Such bicycles are used for exercise, enjoyment, and transporation. Bicycles are typically constructed of tubular frame members and a pair of wheels having tires. Some bicycles have a kickstand which is used to hold the bike in an upright position when not in use. However, use of the kickstand does not prevent a bike from falling and being damaged. Other bikes do not have a kick stand and some method must be employed to hold the bike in an upright position when not in use. One such method is to simply lean the bike against a wall. However, this method suffers from the fact that the bike is easily knocked down by any movement of the bike. Other methods include using expensive equipment to hold the bike in place. This method suffers from the cost involved in obtaining the equipment and that the bike sometimes has to be lifted into place to be held by the equipment. Further, since some bikes and tires are expensive it is important to be able to hold or store the bike in an upright position without damaging the bike, the bike frame, or the tires. Additionally, some of the previous devices used to hold a bicycle have been relatively complicated in design and have required users to exercise significant care and skill in order to use such devices. In view of such factors, there has thus remained a need for a bicycle stand which is of simple design and construction and easy to use.

The present invention is designed to obviate and overcome many of the disadvantages and shortcomings associated with prior methods or devices for holding or storing a bicycle in an upright position. Further, if a bicycle stand is to be readily acceptable by bicycle owners it must be easy to use, it must be able to protect the frame, wheels, and tires of the bike, and it must require no modifications to the bicycle. Moreover, the present invention provides a bicycle stand that is easy to use and does not require any modifications to an existing bicycle.

SUMMARY OF THE INVENTION

In one form of the present invention, a bicycle stand for supporting a wheel of a bicycle comprises a base having a front end and a back end, a ramp mounted on the front end of the base, a three-way hinge having three hinge portions with one of the hinge portions being attached to the ramp, a pair of opposed base supports mounted on the back end of the base, a pair of opposed side supports with each of the side supports being attached to one of the hinge portions, a pair of movable support rods with each of the rods connected to one of the base supports and one of the side supports, and a tensioning member connected to the ramp and one of the side supports.

In another form of the present invention, a bicycle stand for supporting a wheel of a bicycle comprises a base having a front end and a back end, a ramp mounted on the front end of the base, the ramp having an incline portion and a flat portion, a three-way hinge having three hinge portions with one of the hinge portions being attached to the flat portion of the ramp, a pair of opposed support blocks mounted on the back end of the base, a pair of opposed side supports with each of the side supports being attached to one of the hinge portions, a pair of support arms with each of the arms connected to one of the support blocks and one of the side supports, and a tensioning member connected to the ramp and one of the side supports.

In yet another form of the present invention, a bicycle stand for supporting a wheel of a bicycle in an upright position comprises a base having a front end and a back end, a ramp mounted on the front end of the base, the ramp having an incline portion and a flat portion, a three-way hinge having three hinge portions with one of the hinge portions being attached to the flat portion of the ramp, a pair of opposed support blocks mounted on the back end of the base, a pair of opposed side supports with each of the side supports being attached to one of the hinge portions, the side supports adapted to be in an open position and a closed position with the side supports engaging a wheel of a bicycle when in the closed position, a pair of support arms with each of the arms connected to one of the support blocks and one of the side supports, and a tensioning member connected to the ramp and one of the side supports.

In light of the foregoing comments, it will be recognized that a principal object of the present invention is to provide an improved bicycle stand.

Another object of the present invention is to provide a bicycle stand which is of simple construction and design and which can be easily employed with highly reliable results.

Another object of the present invention is to provide a bicycle stand that allows for easy positioning of a bicycle within the stand and easy removal of a bicycle from the stand.

A further object of the present invention is to provide a bicycle stand which is capable of being manufactured using commonly available materials and components that are relatively inexpensive.

A still further object of the present invention is to provide a bicycle stand that is reusable, movable, and transportable.

Another object of the present invention is to provide a bicycle stand that is capable of securing a tire of a bicycle in place and preventing the tire from moving until the bicycle is removed from the bicycle stand.

These and other objects and advantages of the present invention will become apparent after considering the following detailed specification in conjunction with the accompanying drawings, wherein:

BRIEF DESCRIPTION OF THE DRAWINGS

FIG. 5 is a partial top view of a three-way hinge constructed according to the present invention;

FIG. 6 is a partial front view of the three-way hinge; and

FIG. 7 is a perspective view of a support which has been removed from the bicycle stand.

DETAILED DESCRIPTION OF THE PREFERRED EMBODIMENTS

Figure 1:
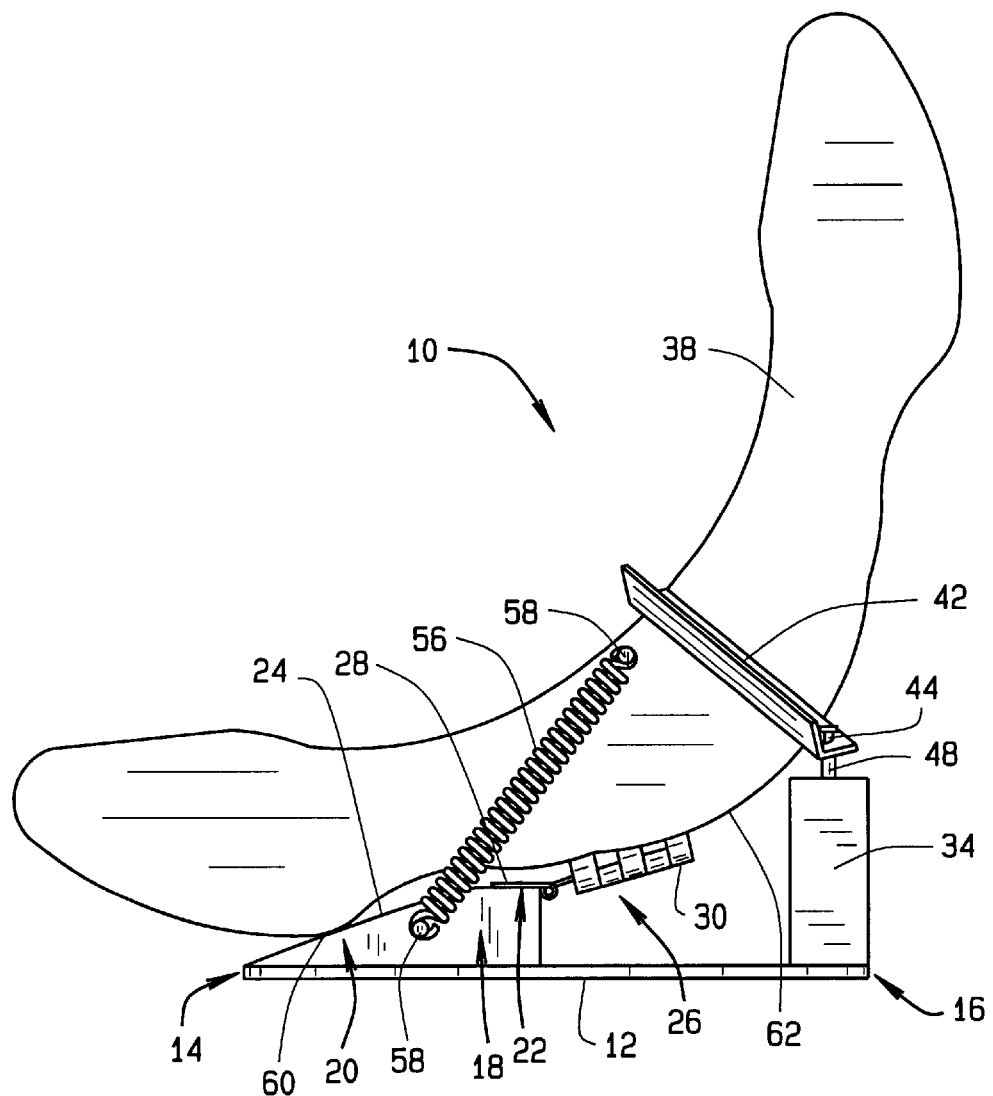
FIG. 1 is a side view of a preferred embodiment of a bicycle stand constructed according to the present invention shown in an open position ready to receive a wheel or a tire of a bicycle.
Figure 2:
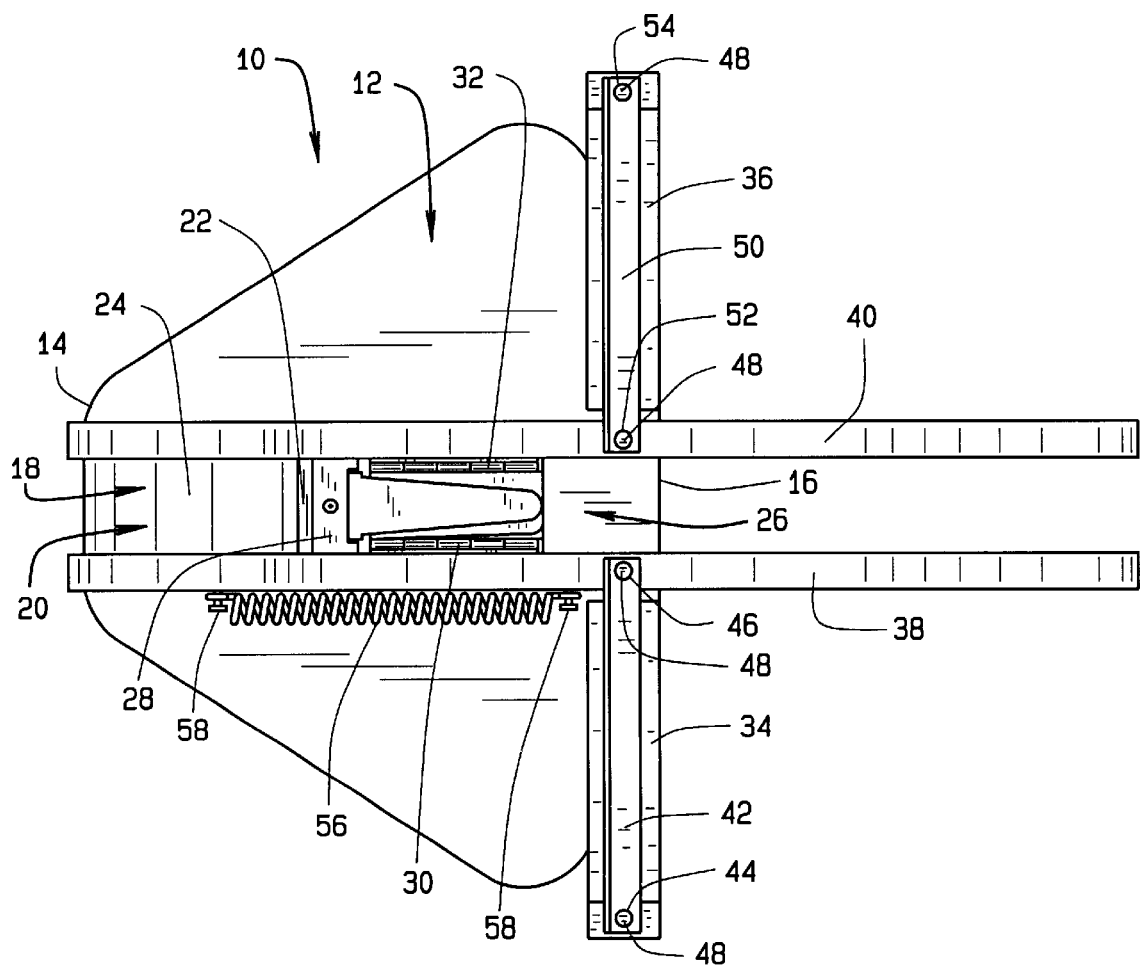
FIG. 2 is a top view of a preferred embodiment of a bicycle stand constructed according to the present invention shown in a closed position.

Referring now to the drawings, wherein like numbers refer to like items, number 10 identifies a preferred embodiment of a bicycle stand constructed according to the present invention. With reference now to FIGS. 1 and 2, the bicycle stand 10 comprises a base 12 having a front end 14 and a back end 16. A ramp 18 is mounted or positioned at the front end 14 of the base 12. The ramp 18 has an inclined portion 20 and a flat or straight portion 22. The inclined portion 20 and the flat portion 22 provide a wheel or tire engaging surface 24 which directs a tire of a bicycle on or off the ramp 18. The ramp 18 is stationary or fixed and may be connected or attached to the base 12 by any suitable manner such as by using screws, nails, bolts, or adhesive. A three-way hinge 26 has three hinge portions 28, 30, and 32. The hinge portion 28 is attached or connected to the flat portion 22 of the ramp 18. The hinge portion 28 may be connected to the flat portion 22 by any suitable connection means, such as screws, nails, bolts, or adhesive. The construction of the three-way hinge 26 will be discussed in more detail herein.

A pair of opposed base supports or blocks 34 and 36 are connected or positioned on the back end 16 of the base 12. The base supports 34 and 36 have a general triangular shape and are stationary. A pair of opposed side members or supports 38 and 40 are also provided and the supports 38 and 40 are attached to one of the other two hinge portions 30 and 32, respectively. The side supports 38 and 40 are sized and shaped to interact with the base 12, the ramp 18, and the base supports 34 and 36, as will be explained further herein. A support arm or rod 42 is connected to the support block 34 and the side support 38. The support arm 42 is capable of pivoting, rotating, or moving with respect to movement of the side support 38. The support arm 42 includes a pair of openings 44 and 46 through which are inserted pivot pins 48. Other pivoting means may be employed instead of pivot pins 48. For example, bolts, screws, or nails may be used as the pivot pins 48. Another support arm or rod 50 is connected to the support block 36 and the side support 40. The support arm 50 also includes a pair of openings 52 and 54 through which are inserted the pivot pins 48. The support arm 50 is also capable of pivoting, rotating, or moving with respect to the side support 40. The support arms 42 and 50 may take on various forms such as an L-shaped member, an angle iron member, a rectangular member, a circular rod, or a rectangular rod. A tensioning member 56, such as a spring, a coil, or a band, is connected to the support member 38 and the ramp 18 by use of pivot pins 58. The tensioning member 56 may also being connected to the support member 40 and the ramp 18. It is also possible and contemplated to have two tensioning members 56.

The side supports 38 and 40 interact with base 12, the ramp 18, and the support blocks 34 and 36 in the following manner. The side supports 38 and 40 each have a first cam or stop surface 60 which is adapted to contact or abut the inclined portion 20 and the surface 24 of the ramp 18 when the side supports 38 and 40 are in an open position. The side supports 38 and 40 each have a second cam or stop surface 62 which is adapted to contact or abut the base 12 when the side supports 38 and 40 are in a closed position. The side supports 38 and 40 also fit between the support blocks 34 and 36 when the side supports 38 and 40 are in a closed position. The support blocks 34 and 36 are spaced far enough apart to receive the side supports 38 and 40 when the bicycle stand 10 is in a closed position. The support blocks 34 and 36 are used to trap the side supports 38 and 40 when the bicycle stand 10 is in a closed position.

Figure 3:
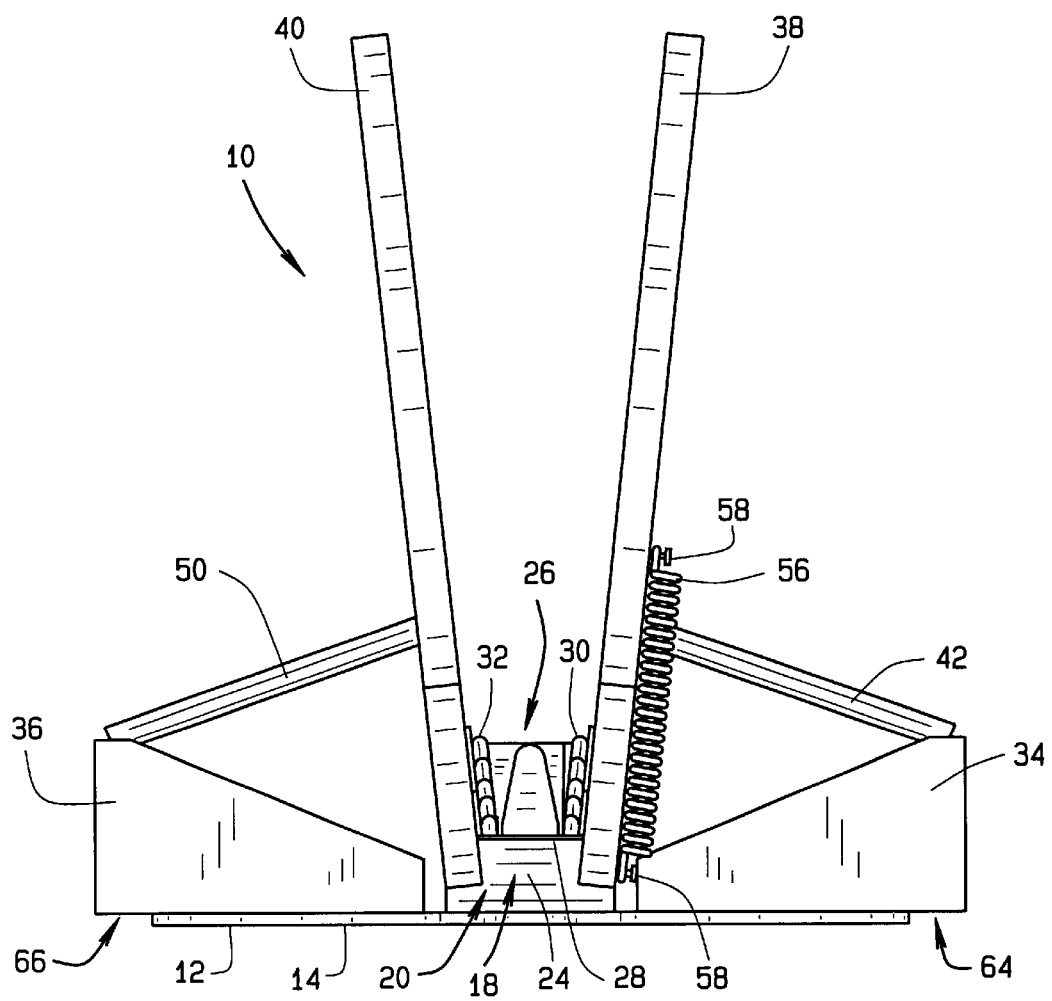
FIG. 3 is a front view of a preferred embodiment of a bicycle stand constructed according to the present invention shown in an open position ready to receive a wheel or a tire of a bicycle.

With reference now to FIG. 3, the bicycle stand 10 is shown in an open position ready to receive a wheel or a tire of a bicycle. The bicycle stand 10 comprises the base 12 having the ramp 18 mounted or positioned at the front end 14 of the base 12. The ramp 18 has the inclined portion 20 with the wheel or tire engaging surface 24 which is used to direct a tire of a bicycle on or off the ramp 18. The three-way hinge 26 is shown having the three hinge portions 28, 30, and 32. The hinge portion 28 is attached or connected to the ramp 18. The hinge portion 30 is connected to the side support 38 and the hinge portion 32 is connected to the side support 40. The side supports 38 and 40 are also shown contacting or abutting the surface 24 of the inclined portion 20 of the ramp 18. The hinge 26 is also shown being in an upright position being ready to receive a wheel or a tire of a bicycle. In this position, the hinge 26 is an extension of the inclined portion 20 of the ramp 18.

The pair of opposed base supports or blocks 34 and 36 are connected or positioned on the base 12. The supports 34 and 36 are shown having a general triangular shape. A portion 64 of the block 34 extends out from the base 12 and a portion 66 of the block 36 also extends out from the base 12. Although the base supports 34 and 36 are shown extending out from the base 12, it is also possible and contemplated that the base supports 34 and 36 may be sized to be even with the base 12 so as not to extend out from the base 12 or to be within the base 12. The side support 38 is shown being attached to the hinge portion 30. The side support 40 is also depicted being connected to the hinge portion 32. In an open position, the bicycle stand 10 has the two side supports 38 and 40 spread apart ready to receive a wheel or a tire of a bicycle. The support arms 42 and 50 are shown being pivoted or positioned away from the support blocks 34 and 36. Further, the tensioning member 56 is not being flexed, expanded, or stretched.

Figure 4:
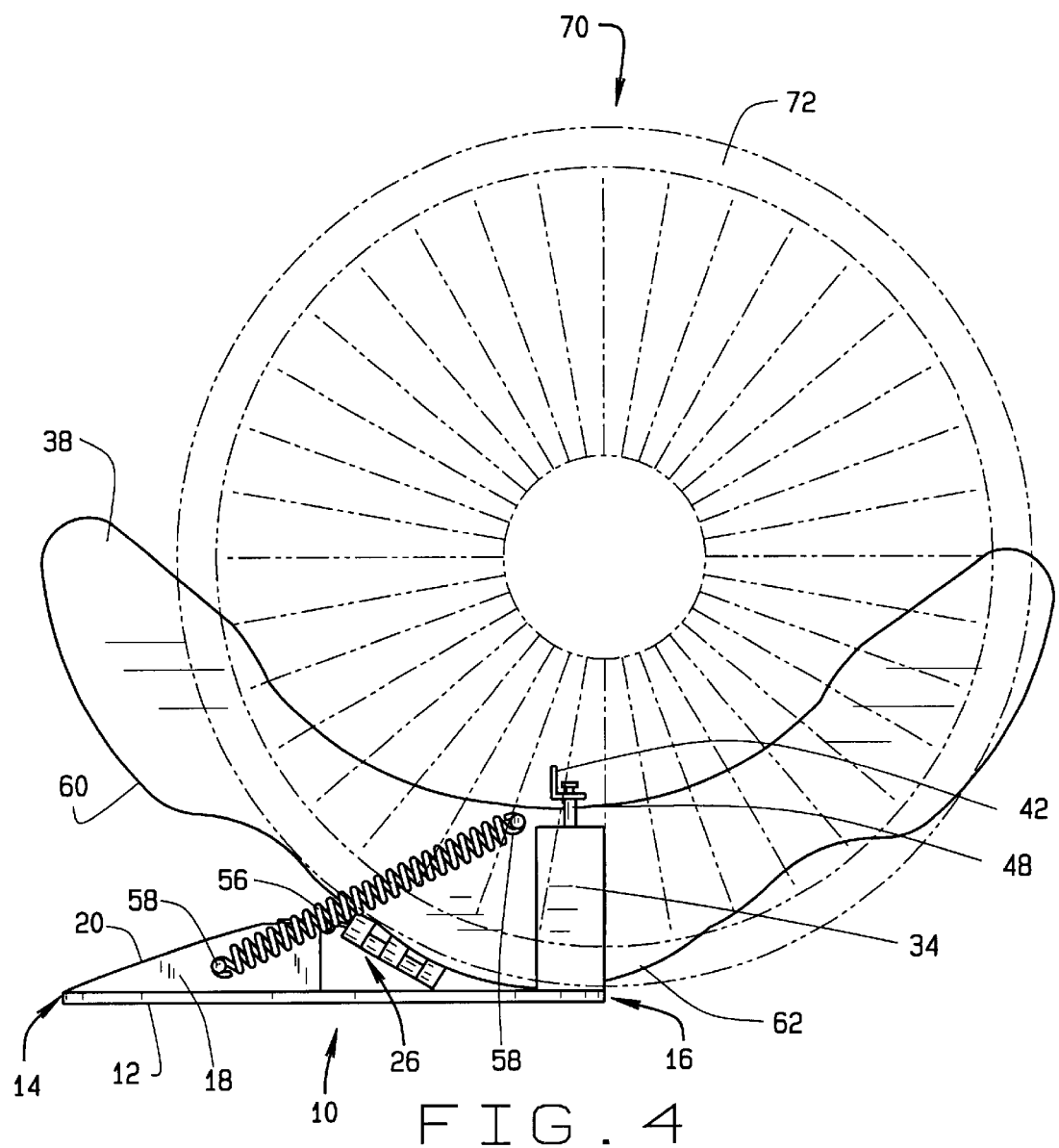
FIG. 4 is a side view of the bicycle stand shown in FIG. 1 illustrated in a closed position with a wheel shown in phantom.

FIG. 4 illustrates a side view of the bicycle stand 10 in a closed position receiving and holding or capturing a wheel 70 having a tire 72, both of which are shown in phantom. The bicycle stand 10 is shown to comprise the base 12 having the front end 14 and the back end 16. The ramp 18 has the inclined portion 20 and the three-way hinge 26 connected to the ramp 18. The hinge 26 is shown in a down position due to the weight of the wheel 70 moving the hinge 26. The tensioning member 56 is shown connected to the ramp 18 and the side support 38 by use of the pivot pins 58. The tensioning member 56 is shown in an expanded or stretched position. The support arm 42 is connected to the pivot pin 48 and the support arm 42 is shown being positioned over the support block 34. The cam surface 62 of the support 38 is contacting the base 12 of the stand 10. The side support 38 is also holding or capturing the wheel 70 and the tire 72. The cam surface 60 has been released from the ramp 18. In this closed position the wheel 70 and the tire 72 are being supported between the side supports 38 and 40 and supported on the base 12 and the hinge 26.

In operation, the bicycle stand 10 is in an initial or open position ready to receive a wheel or a tire of a bicycle. Such position is illustrated in FIGS. 1 and 3. In particular, the side supports 38 and 40 are spread apart, the support arms 42 and 50 are in a pivoted or angled position with respect to the support blocks 34 and 36, the hinge 26 is in an upright position, and the tensioning member 56 is not expanded or stretched. A wheel of a bicycle is then rolled up the inclined portion 20 of the ramp 18. A wheel is continued rolling onto the hinge 26 with the weight of a wheel or a bicycle pressing down on the hinge 26 to move the hinge in a downward position. Movement of the hinge 26 causes the hinge portions 28, 30, and 32 to move which also moves the side supports 38 and 40 toward each other and the side supports 38 and 40 are capable of enclosing or capturing a wheel placed there between. Further movement of a wheel, the hinge 26, and the side supports 38 and 40 causes the support arms 42 and 50 to pivot toward the support blocks 34 and 36 and the tension member 56 to be expanded or stretched. A wheel finally comes to rest on the base 12 and against the hinge 26 and the side supports 38 and 40. The stop surfaces 62 of each of the side supports 38 and 40 abut the base 12. This helps to prevent the side supports 38 and 40 from rolling over the base. Further, the side supports 38 and 40 are captured between the support blocks 34 and 36. A wheel is captured in an upright position between the side supports 38 and 40. It should also be noticed that the support arms 42 and 50 have pivoted to a position that is directly above the side supports 34 and 36. The tensioning member 56 is fully extended at this point. A closed position of the bicycle stand 10 is shown in FIGS. 2 and 4. To remove a wheel from the bicycle stand 10, the process is reversed. Once a wheel is removed from the bicycle stand 10, the bicycle stand 10 will be in an open position as is depicted in FIGS. 1 and 3.

With reference now to FIG. 5, a top view of the three-way hinge 26 is illustrated. The three-way hinge 26 comprises the three hinge portions 28, 30, and 32. The three hinge portions 28, 30, and 32 may be formed from separate hinges that are welded, attached, or connected together. Also, the hinge 26 may be a single unitary construction having the three hinge portions 28, 30, and 32. Further, the hinge portion 28 may be modified to have a plate or portion 80 which is sized and shaped to fit between the hinge portions 30 and 32. The hinge portion 30 is connected to the side support 38 and the hinge portion 32 is connected to the side support 40. The hinge portion 28 may be connected to the flat portion 22 of the ramp 18 by use of a screw 82 or other suitable fastening device or method.

FIG. 6 shows a front view of the three-way hinge 26. The hinge portion 30 has a plate 84 and the hinge portion 32 has a plate 86. The plate 80 of the hinge portion 28 is connected or attached to the plate 86 of the hinge portion 32. The plate 86 is in turn connected or attached to the plate 84 of the hinge portion 30. In this manner, the three-way hinge 26 is capable of movement in three directions. The hinge portion 28 is capable of moving the hinge 26 in an up and down direction. The hinge portions 30 and 32 are adapted to moving the side supports 38 and 40 in a sideways direction.

The side support 40 is illustrated in FIG. 7 being removed from the bicycle stand 10. The side support 40 has a generally U-shape or semicircular shape and has a front end portion 90 and a back end portion 92. The side support has an interior surface 94 which is adapted to contact a wheel or a tire of a bicycle. As can be appreciated, the interior surface 94 captures, holds, and supports a wheel or a tire when in the bicycle stand 10. The cam or stop surfaces 60 and 62 are also shown.

Although not illustrated, it is also possible and contemplated to provide openings or holes in one or both of the side supports 38 and 40 for inserting a locking device. In this manner, a locking device may be inserted through the opening or openings of the side supports 38 and 40 and a tire of a bicycle to lock a bicycle to the bicycle stand 10.

It is also possible to provide protective coverings on interior surfaces, such as the interior surface 94 of the side support 40, of the side supports 38 and 40 and on the ramp 18. In particular, felt, rubber, carpeting, or any other suitable protective covering may be provided on the ramp 18 or interior surfaces of the side supports 38 and 40 in order to protect a bicycle frame, wheel, or tire from being damaged by the bicycle stand 10. Further protection may be provided on the three-way hinge 26.

It should be recognized that the bicycle stand 10 of the present invention can be constructed of various materials and can be assembled from separable components or formed as a unitary construction. Preferably, the bicycle stand 10 will be constructed of relatively lightweight materials. For example, the stand 10 may consists of wood, metal, plastic, or combinations of these materials. Further, it is also possible that two of the bicycle stands 10 may be employed to hold a front and a rear tire of a bicycle. Two stands 10 may be used to hold a bicycle in a stable, upright position for storage or transportation or for use in repairing a bicycle. Although bicycle stand 10 has been depicted using various geometric forms, it should be recognized that the bicycle stand of the present invention may take many different forms and shapes.

From all that has been said, it will be clear that there has thus been shown and described herein a bicycle stand which fulfills the various objects and advantages sought therefor. It will become apparent to those skilled in the art, however, that many changes, modifications, variations, and other uses and applications of the subject bicycle stand are possible and contemplated. All changes, modifications, variations, and other uses and applications which do not depart from the spirit and scope of the invention are deemed to be covered by the invention, which is limited only by the claims which follow.

What is claimed is:

1. A bicycle stand for supporting a wheel of a bicycle comprising:
   a base having a front end and a back end;
   a ramp mounted on the front end of the base;
   a three-way hinge having three hinge portions with one of the hinge portions being attached to the ramp;
   a pair of opposed base supports mounted on the back end of the base;
   a pair of opposed side supports with each of the side supports being attached to one of the hinge portions;
   a pair of support arms with each of the arms connected to one of the base supports and one of the side supports; and
   a tensioning member connected to the ramp and one of the side supports.

2. The bicycle stand of claim 1 wherein each of the pair of opposed side supports comprises a first cam surface and a second cam surface.

3. The bicycle stand of claim 2 wherein each of the first cam surfaces is adapted to contact the ramp when the bicycle stand is in an open position.

4. The bicycle stand of claim 2 wherein each of the second cam surfaces is adapted to contact the back end of the base when the bicycle stand is in a closed position.

5. The bicycle stand of claim 1 wherein each of the pair of opposed side supports is a generally U-shaped member and each of the side supports is adapted to capture a wheel of a bicycle between the side supports when the bicycle stand is in a closed position.

6. The bicycle stand of claim 1 wherein each of the support arms is pivotally mounted to one of the base supports and to one of the side supports.

7. The bicycle stand of claim 1 wherein the three-way hinge provides pivoting motion to the side supports relative to the ramp and to the side supports relative to each of the side supports.

8. The bicycle stand of claim 1 wherein the tensioning member is a spring.

9. A bicycle stand for supporting a wheel of a bicycle comprising:
   a base having a front end and a back end;
   a ramp mounted on the front end of the base, the ramp having an incline portion and a flat portion;
   a three-way hinge having three hinge portions with one of the hinge portions being attached to the flat portion of the ramp;
   a pair of opposed support blocks mounted on the back end of the base;
   a pair of opposed side supports with each of the side supports being attached to one of the hinge portions;
   a pair of support arms with each of the arms connected to one of the support blocks and one of the side supports; and
   a tensioning member connected to the ramp and one of the side supports.

10. The bicycle stand of claim 9 wherein each of the pair of opposed side supports comprises a first cam surface and a second cam surface, with the first cam surfaces adapted to abut the incline portion of the ramp and the second cam surfaces adapted to abut the back end of the base.

11. The bicycle stand of claim 9 wherein each of the pair of opposed side supports is a generally U-shaped member and each of the side supports is adapted to capture a wheel of a bicycle between the side supports when the bicycle stand is in a closed position.

12. The bicycle stand of claim 9 wherein each of the support arms is pivotally mounted to one of the support blocks and to one of the side supports.

13. The bicycle stand of claim 9 wherein the three-way hinge provides pivoting motion to the side supports relative to the ramp and to the side supports relative to each of the side supports.

14. The bicycle stand of claim 9 wherein the side supports are adapted to be in an open position and a closed position with the side supports adapted to engage a wheel of a bicycle when in the closed position.

15. A bicycle stand for supporting a wheel of a bicycle in an upright position comprising:
   a base having a front end and a back end;
   a ramp mounted on the front end of the base, the ramp having an incline portion and a flat portion;
   a three-way hinge having three hinge portions with one of the hinge portions being attached to the flat portion of the ramp;
   a pair of opposed support blocks mounted on the back end of the base;
   a pair of opposed side supports with each of the side supports being attached to one of the hinge portions, the side supports adapted to be in an open position and a closed position with the side supports adapted to engage a wheel of a bicycle when in the closed position;
   a pair of support arms with each of the arms connected to one of the support blocks and one of the side supports; and
   a tensioning member connected to the ramp and one of the side supports.

16. The bicycle stand of claim 15 wherein each of the pair of opposed side supports comprises a first cam surface and a second cam surface, with the first cam surfaces adapted to abut the incline portion of the ramp and the second cam surfaces adapted to abut the back end of the base.

17. The bicycle stand of claim 15 wherein each of the pair of opposed side supports is a generally U-shaped member and each of the members is adapted to capture a wheel of a bicycle between the side supports when the bicycle stand is in the closed position.

18. The bicycle stand of claim 15 wherein each of the support arms is pivotally mounted to one of the support blocks and to one of the side supports.

19. The bicycle stand of claim 15 wherein the three-way hinge provides pivoting motion to the side supports relative to the ramp and to the side supports relative to each of the side supports.

20. The bicycle stand of claim 15 wherein the side supports are positioned between the support blocks when the side supports are in the closed position.

* * * * *